United States Patent [19]

Daniel

[11] 4,349,339
[45] Sep. 14, 1982

[54] FORCE-INDICATING DUMMY LEGS

[75] Inventor: Roger P. Daniel, Dearborn, Mich.

[73] Assignee: Ford Motor Company, Dearborn, Mich.

[21] Appl. No.: 288,873

[22] Filed: Jul. 31, 1981

[51] Int. Cl.³ .............................................. G09B 23/32
[52] U.S. Cl. .................................................... 434/274
[58] Field of Search ....................... 434/267, 274, 275; 73/432 SD

[56] References Cited

U.S. PATENT DOCUMENTS 4,235,025 11/1980 Kortge ................................ 434/274
4,276,032 6/1981 Woley ................................. 434/274

Primary Examiner—Harland S. Skogquist
Attorney, Agent, or Firm—John R. Roethel; C. L. Sadler

[57] ABSTRACT

Force-indicating legs adapted to be fitted to the pelvic assembly of an anthropomorphic dummy for use in the dynamic testing of vehicle passenger restraint systems. The legs permit the measurement of most of the skeletal forces that are likely to be experienced during dummy leg contact with a vehicle instrument panel or a knee bolster in dynamic restraint system testing.

Each dummy leg has a knee joint connecting the simulated femur and tibia bones and an ankle joint connecting the simulated tibia bone with a simulated foot structure. Forces acting on the simulated femur and tibia bones are measured by load cells capable of measuring axial (Z axis) compression and tension loads, shear loads on both orthogonal (X and Y) axes, lateral and longitudinal (or vertical) bending moments, and torsional moments. Knee shear load in the knee joint and upward angle bending load in the ankle joint are measured by load cells capable of measuring at least the axial loads resulting in the respective knee shear or ankle bending loads.

The knee joint preferably includes biasing means to allow biomechanically correct tibia-to-femur movement during knee shear load measurements.

7 Claims, 6 Drawing Figures

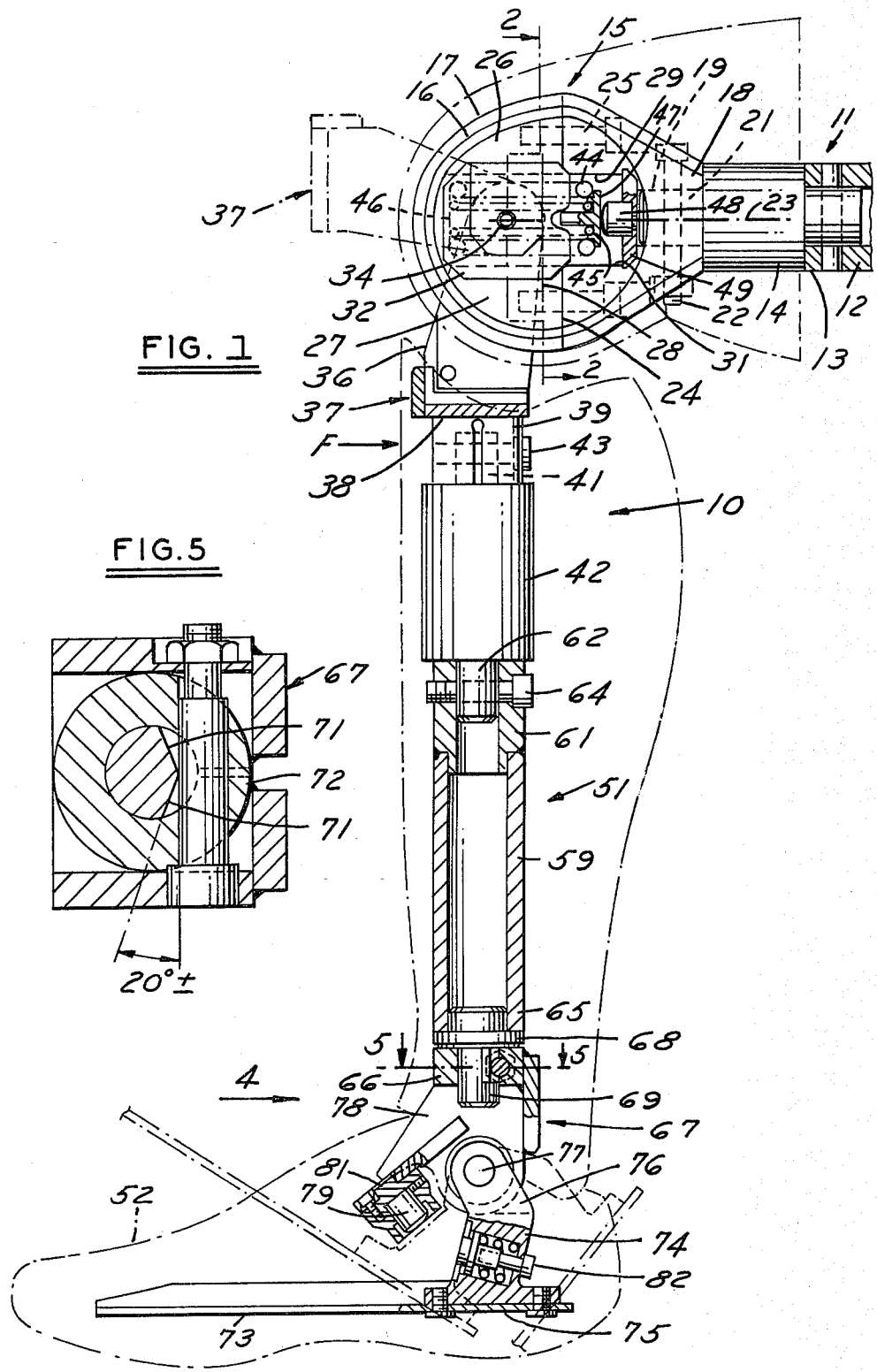

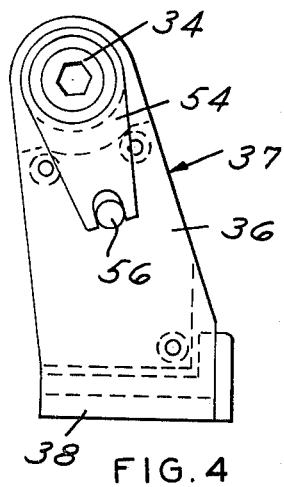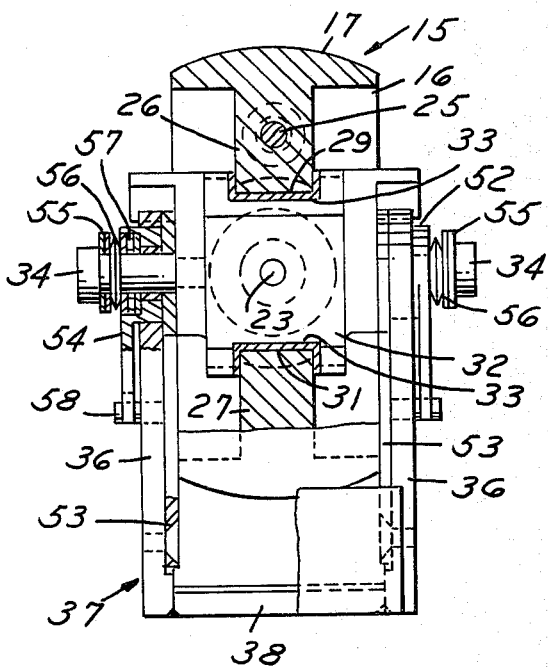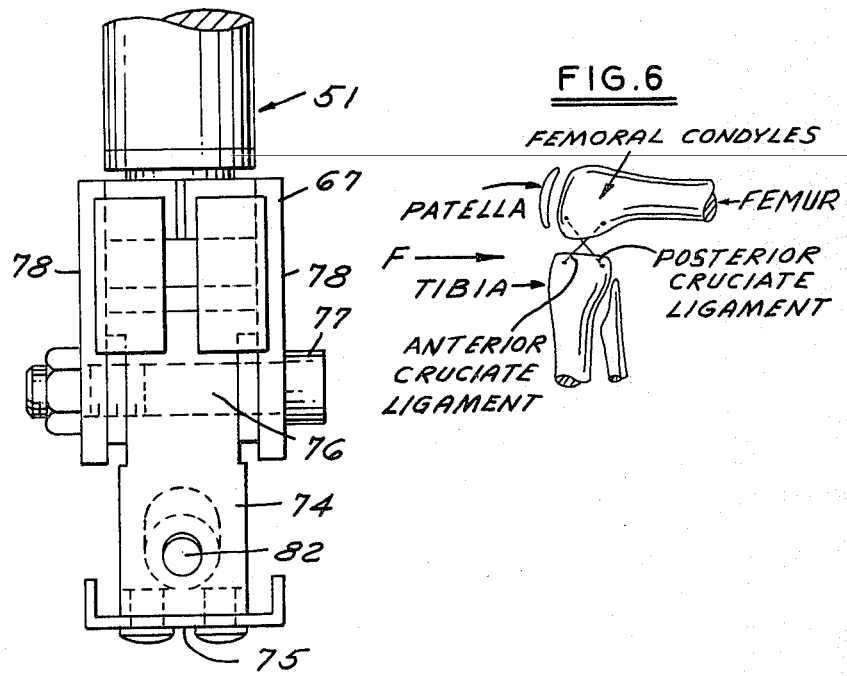

FORCE-INDICATING DUMMY LEGS

BACKGROUND OF THE INVENTION

For some time it has been recognized that the femur axial force measurement required by Federal Motor Vehicle Safety Standards (Occupant Crash Protection) did not necessarily reflect the true injury potential to a front seated vehicle passenger's legs during a crash test. In 1975, a report was presented at the 19th Stapp Car Crash Conference by R. P. Daniel, the inventor of the force-indicating dummy legs embodying the present invention, and Messrs. K. R. Trosien and B. O. Young. The report, entitled "The Impact Behavior of the Hybrid II Dummy" (Proceedings of the 19th Stapp Car Crash Conference, 1975, pp. 117–137), disclosed that femur bending and torsional moments can be major loading mechanisms during sled or vehicle crash tests. Several attempts at strain gaging the tibia to measure some of these loading mechanisms were without much success.

The consideration of particularly two-point harness/knee bolster passive restraint systems to meet the requirements of Federal Motor Vehicle Safety Standard 208 led to the need to accurately and reliably measure these and other leg loads. Such systems are likely to impose considerable and varied loading on the legs in forward crash situations, depending upon the bolster's size, shape, location, and energy absorbing and knee pocketing characteristics.

In 1978 and 1979, two events took place which made the development of force indicating legs possible. First, a paper was presented which described the mechanism of the human knee joint and gave tentative load deflection values for the joint up to rupture of the posterior cruciate ligament. This paper, by D. C. Viano et al, was entitled "Bolster Impacts to the Knee and Tibia of Human Cadavers and an Anthropomorphic Dummy" (Proceedings of the 22nd Stapp Car Crash Conference, 1978, pp. 403–428). Secondly, six-axis femur and tibia load cells were developed which provided accurate, compact, and replaceable load and moment measuring capability.

Several requirements were identified for the force indicating legs. It was believed necessary that the final design should:

1. Be capable of measuring tibia and femur (a) axial (tension/compression) loads, (b) shear loads in both orthogonal axes, (c) bending moments in both planes, and (d) torsional moments about the longitudinal axes.
2. Be capable of measuring tibia-to-femur (knee joint) shear loads.
3. Have knee joint load deflection capability.
4. Have a more human-like knee joint contact area.
5. Reduce the skeletal-to-flesh weight ratio of the current dummy legs.
6. Be adaptable to other size dummies.
7. Measure the ankle joint upward loading.
8. Be durable, reliable and easy to use.

SUMMARY OF THE INVENTION

In the force indicating dummy legs embodying the present invention, multi-axis load cells are integrated with the femur and tibia bone simulations to measure the desired loads and moments. A spring-loaded load cell is part of the tibia-to-femur intersection to measure knee shear load; and an ankle load cell is used to measure ankle joint upward torque once the foot reaches its limit of natural movement. The lower leg link is designed to be easily replaceable to allow different length links, to match the dimensions of other size dummies.

BRIEF DESCRIPTION OF THE DRAWINGS

Further features and advantages of the present invention will be made more apparent as this description proceeds, reference being had to the accompanying drawings, wherein:

FIG. 1 is a side elevation sectional view through an anthropomorphic dummy force-indicating leg of this invention;

FIG. 2 is an enlarged sectional view taken on the line 2—2 of FIG. 1;

FIG. 3 is a side elevational view of FIG. 2;

FIG. 4 is a front elevational view taken in the direction of the arrow 4 in FIG. 1;

FIG. 5 is a section view taken on the line 5—5 of FIG. 1; and

FIG. 6 is a schematic sketch of a human knee joint.

DETAILED DESCRIPTION OF THE INVENTION

Referring now to the drawings, and more particularly to FIG. 1, there is shown a force-indicating dummy leg, generally designated 10, embodying the present invention. A pair of these legs are adapted to be fitted to the pelvic assembly (not shown) of an anthropomorphic 50th percentile male dummy. Provision is made, however, for conversion of the legs for use with 5th percentile and 95th percentile dummies.

The leg 10 has a simulated femur bone 11 in the form of an elongated tubular member or casting 12 that is coupled at one end 13 to a femur load cell 14 which is capable of measuring axial (Z axis) compressiona and tension loads, shear loads on both orthogonal (X and Y) axes, lateral bending moments, vertical bending moments, and Z axis torsional moments on the femur. The opposite end (not visible) of the simulated femur bone 11 is adapted to be coupled to the pelvic assembly of the anthropomorphic dummy in any convenient manner.

The femur load cell 14 couples the femur bone 11 to a kneeform 15. The kneeform 15 is a modified annulus or ring 16 having, in frontal elevation, a substantially barrel-shaped exterior configuration. Instead of a side view circular contact area (see FIG. 1), the top 17 of the kneeform is partially truncated to slightly reduce the contact area to be more in line with the human knee skeletal shape and contact area. At one side, that is, the rear of the kneeform 15, the annulus 16 is provided with an externally tapered wall section 18 having a radial socket 19. This socket 19 receives a cylindrical tang or shank 21 on the femur load cell 14 opposite the end of the latter that is coupled to the simulated femur bone 12. A transversely extending bolt 22 secures the kneeform 15 to the load cell 14.

The center of the annulus 16 lies on the longitudinal axis 23 of the simulated femur bone 12. The annulus 16 is separable into two sections 16a and 16b along a chord 24 extending transversely of the axis 23. The sections are held in assembled relationship by longitudinally extending bolts 25. The annulus has two internal wall sections 26 and 27 that straddle the vertical center 28 of the kneeform (see FIG. 2). The walls 26 and 27 terminate in spaced, opposed relationship to each other with their facing surfaces 29 and 31 forming parallel chords paralleling the longitudinal axis 23 of the simulated femur bone 12.

The wall sections 26 and 27 form upper and lower guideways for a slide 31 slidable on the surfaces 29 and 31. Interposed between the slide 32 and the contiguous wall surfaces 29 and 31 are suitable low friction slide bearings 33, preferably made of low friction plastic material such as nylon.

The slide 32 is pivotally coupled by stripper bolts 34 to the upper ends of the legs 36 of a knee clevis, generally designated 37. Depending from the base 38 of the knee clevis 37 is a collet 39 that receives the upper cylindrical tang or shank 41 of a tibia load cell 42. The clamping action of the collet 39 is achieved by a clamp screw 43.

The load/deflection capability of the knee joint is considered to be a very important aspect of the dummy leg embodying the present invention. As has been described, the top 17 of the kneeform 15 is preferably partially truncated to slightly reduce the contact area to be more in line with the human knee skeletal shape and contact area. The human knee joint is shown schematically in FIG. 6. It is essentially held together by the posterior and anterior cruciate ligaments. When a force F is applied to the tibia in the front-to-rear direction, the tibia can move rearward in relation to the femoral condyles. This movement is resisted by tension in the posterior cruciate ligament. This relative movement, up until failure of the ligament, is a safety factor in that the movement tends to make the strong femoral condyles and patella more prominent, so as to tend to transfer load to this strong portion of the leg. From data given in the D. C. Viano et al paper presented at the 22nd Stapp Car Crash Conference in 1978, it was concluded that for male cadaver subjects joint failure began at about 525 pounds and at about 0.62 inch displacement, and that complete failure of the joint occurred at about 610 pounds and 0.93 inch displacement.

The slide 32 connection between the simulated tibia bone 12 and the simulated femur bone 12 simulates the result of the application of force to the human tibia. For the mechanical knee embodying the present invention, two nested springs 45 and 46 are held between an end wall 46 of the slide 32 and a spring adaptor 47 that abuts a knee shear load cell 48 supported on a stop plate 49. The knee shear load cell 48 is positioned to measure forces acting along the longitudinal axis 23 of the simulated femur bone. The springs were chosen to have a spring rate of 692 lbs/inch to approximate the cadaver data. With these springs, the joint became rigid at 0.88 inch diametrical displacement of the slide 32 just before the springs bottomed out. This feature protects the knee shear load cell 48 from an overload. The nylon bearings 33 in the knee joint kept friction low, helping to ensure an accurate load reading. At zero inches travel of the slide 32, the spring preload was set at 25 pounds to minimize the at-rest looseness in the joint.

The knee joint is also preloaded to control swinging movement of the simulated tibia bone and foot about the transverse pivot axis defined by the pivot pins 34. As best seen in FIGS. 2 and 3, the knee clevis legs 36 are spaced from contiguous side surfaces of the annulus 16 by plastic (nylon) bearing plates 53. A pair of friction arms 54, one on each side of the knee clevis 37, are suspended from the stripper bolts 34. Between the head of each stripper bolt 34 and the friction arm 54 is a thrust washer 55 and a Belleville spring 56. Between each friction arm 52 and bearing plate 51 is a thrust bearing 57. Each friction arm 54 is held immovable relative to the clevis leg 36 by a pin 58 anchored in the leg and engaged by the bifurcated lower end of the friction arm. The resistance to swinging movement of the simulated tibia bone 51 relative to the simulated femur bone 12 is controlled by the amount of compression that is placed on the Belleville springs 56 by adjustment of the stripper bolts 34 or by changing the thickness of the thrust washers 55.

The simulated tibia bone 51 is an elongated tubular member 59 having a collet 61 welded to its upper end. The collet 61 receives the lower tang or shank 62 of the tibia load cell 42. The load cell 42 thus functions to couple the simulated tibia bone 51 to the knee clevis 37. A laterally extending clamp screw or bolt 64 controls the clamping force of the collet 61.

At its lower end 65, the simulated tibia bone 51 is coupled to the base plate 66 of an inverted ankle clevis 67 by a double end plug 68. The lower portion 69 of the plug 68 that extends into the base plate 66 provides a journal about which the foot 52 may swivel. The plug portion 69 is laterally notched to provide two angularly related flats 71, best seen in FIG. 5, that are contiguous to a laterally extending stripper bolt 72 which holds the ankle clevis 67 on the lower end 65 of the tubular member 59 and also limits the rotation or ankle twist about the longitudinal axis of the simulated tibia bone. As shown in FIG. 5, the flats 71 preferably are at a 20° angle to the longitudinal axis of the bolt 72 which permits 20° of ankle rotation or twist in either direction from a straight ahead foot position.

The foot 52 comprises a lightweight metal foot plate 73 having an upstanding post 74 near its rear end 75. The upper end 76 of the post is pivotally coupled by a socket head shoulder bolt 77 to the depending legs 78 of the ankle clevis 67.

The ankle load cell 79 is supported on a bracket 81 depending from the legs 78 of the ankle clevis 67 (see FIG. 1). Intermediate the foot plate 73 and the pivotal connection 77 of the post 74 to the ankle clevis 67, the post is recessed to receive a spring-loaded plunger 82 that is in orbital alignment with the load cell 79.

In operation, ankle upward flexion is permitted to about 35°, the published limit of human ankle joint motion, before any resistance occurs, other than joint friction. At that point, the ankle joint movement is resisted by the load cell 79 engaging the spring-loaded plunger 82. Preferably, the now spring-loaded load cell is designed to measure approximately 1000 in./lbs. of torque (750 pounds acting at 1.38 inches from the joint) before the spring-loaded plunger 82 bottoms against its housing. This is to protect the load cell from overload. Should the ankle joint torque exceed the design limits of the joint, the lightweight metal foot is designed to bend to protect the joint.

The multi-axis femur load cell 14 and tibia load cell 42, and the single-axis knee load cell 48 and ankle load cell 79, all were commercially available devices. The specifications of the load cells were as follows:

|  | Femur | Tibia |
|---|---|---|
| Length-overall, in. | 5.00 | 5.00 |
| Diameter-overall, in. | 2.00 | 1.75 |
| Diameter-mounting bosses, in. | 1.00 | .75 |
| Weight, lbs. | 2.00 | 1.75 |
| Axial ($F_z$) load capacity, lbs. | 5000 | 4000 |
| Shear ($F_x,F_y$) load capacity, lbs. | 3000 | 2500 |
| Bending ($M_x,M_y$) moment capacity, | | |

-continued

|  | | |
|---|---|---|
| in.-lbs. | 3000 | 2500 |
| Torsional (Mz) moment capacity, | | |
| in.-lbs. | 6000 | 5000 |
| Overload capacity, all axes, % | 50 | 50 |

|  | Knee | Ankle |
|---|---|---|
| Height, inches | .625 | .625 |
| Diameter, inches | .60 | .60 |
| Weight, lbs. | 0.1 | 0.1 |
| Axial ($F_z$) load capacity, lbs. | 1000 | 2000 |
| Overload capacity, % | 50 | 50 |

The tibia segment 59 between the ankle and the tibia load cell may be fabricated about 3.4 inches shorter than the tibia segment of a 50th percentile male to represent a female foot-to-knee link length, or about 2.2 inches longer to represent the 95th percentile foot-to-knee link length. Thus, by varying the femur and tibia flesh covering, changing the foot plate, varying the length of the lower tibia segment, and changing the knee spring rate for a female, the major components of the same leg could be used for a 5th percentile female through 95th percentile male dummy.

It is to be understood that this invention is not limited to the exact construction illustrated and described above, but that various changes and modifications may be made without departing from the spirit and scope of the invention as defined in the appended claims.

We claim:

1. An anthropomorphic dummy leg for measuring essentially all of the forces that might be applied to a vehicle passenger's leg upon impact with a vehicle instrument panel, knee bolster or other vehicle structural member during a vehicle crash, comprising:
    a dummy leg having a knee joint connecting femur and tibia bone simulations and an ankle joint connecting the tibia bone simulation and a simulated foot;
    a plurality of load cells integrated with the femur and tibia bone simulations, the knee joint and ankle joint;
    the tibia and femur load cells being capable of measuring a plurality of forces and moments acting on the femur and tibia bone simulations and the knee and ankle load cells being capable of measuring at least the axial loads resulting in knee shear load and upward ankle bending load.

2. An anthropomorphic dummy leg according to claim 1, in which:
    the tibia and femur load cells are capable of measuring axial (Z axis) compression and tension loads, shear load on both orthogonal (X and Y) axes, lateral and longitudinal (or vertical) bending moments, and torsional forces on the femur and tibia bone simulations.

3. An anthropomorphic dummy leg according to claim 1 or 2, in which
    the ankle load cell is responsive to measure the upward ankle bending load after the foot has been rotated through a predetermined upward joint movement.

4. An anthropomorphic dummy leg according to claim 1 or 2, in which:
    the knee joint includes biasing means allowing biomechanically correct tibia-to-femur bone simulation movement as the knee shear load is measured.

5. An anthropomorphic dummy leg having a femur bone simulation and a tibia bone simulation connected by a mechanical knee joint;
    the mechanical knee joint comprising an annulus, the top of which is partially truncated to reduce the contact area to correspond to a more human-like knee skeletal shape and contact area;
    slide means within the annulus;
    guide means guiding the slide means for diametrical movement within the annulus toward and from the femur bone simulation along a longitudinal axis of the latter;
    a knee clevis coupled to the tibia bone simulation;
    pivot means pivotally coupling the knee clevis to the slide means to provide a pivot axis that extends transversely of the longitudinal axis of the femur bone simulation;
    the tibia bone simulation being swingable about the pivot axis as the pivot axis is carried on the slide means toward the femur bone simulation;
    and biasing means resisting movement of the slide means toward the femur bone simulation at a predetermined spring rate.

6. An anthropomorphic dummy leg according to claim 5, in which:
    the pivot means coupling the knee clevis to the slide means includes an adjustably preloaded friction means controlling the freedom of swinging movement of the tibia bone simulation relative to the femur bone simulation.

7. An anthropomorphic dummy leg having a tibia bone simulation connected to a foot simulation by a mechanical ankle joint;
    the ankle joint including an ankle clevis;
    a first pivot means connecting the ankle clevis to the lower end of the tibia bone simulation for limited swivelling movement of the one relative to the other about the longitudinal axis of the tibia bone simulation;
    a second pivot means coupling a foot plate of the foot simulation to the ankle clevis for pivotal movement about an axis transversely of the tibia bone simulation;
    and a load cell carried on the ankle clevis engageable with a biasing means carried on the foot plate upon upward flexion of the foot;
    the load cell measuring the upward ankle bending load.

* * * * *